April 16, 1968  M. J. G. TIPPER  3,377,692
CLIPPING APPARATUS
Filed Oct. 13, 1966  3 Sheets-Sheet 1
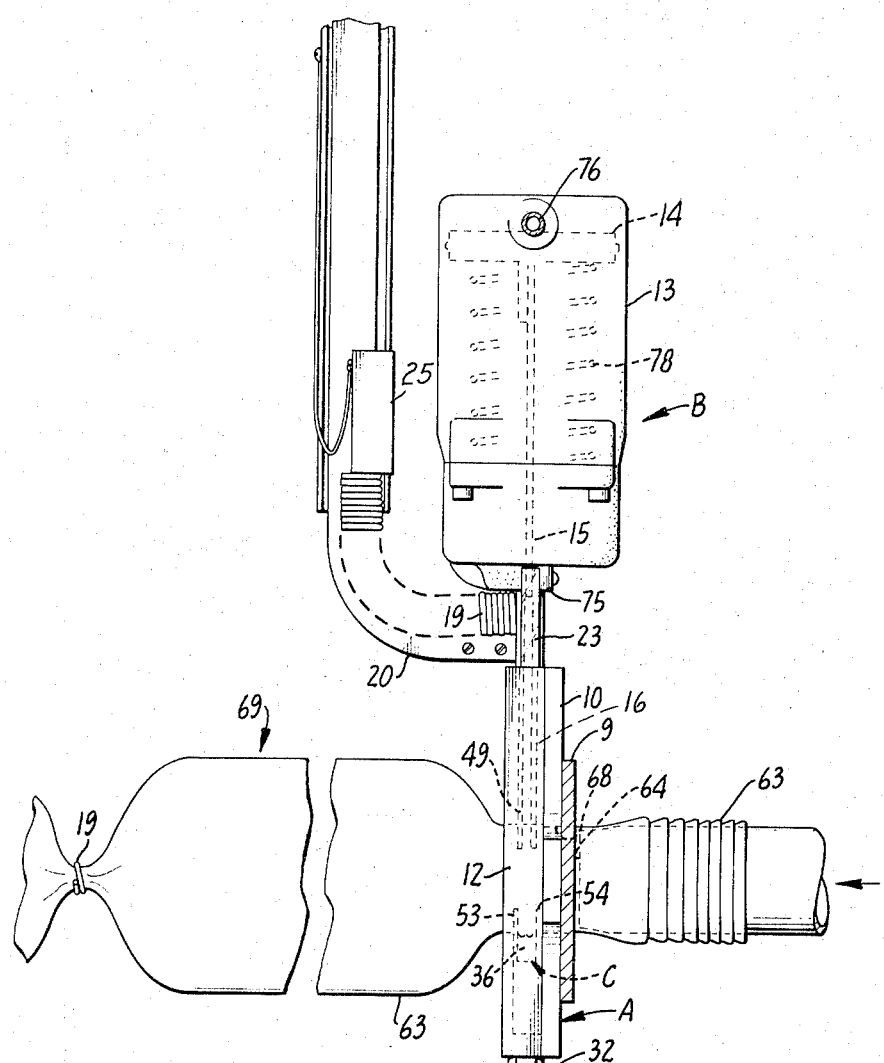
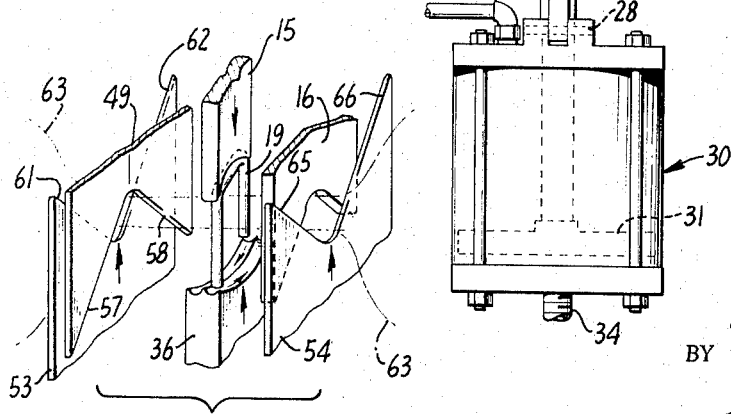
INVENTOR
MAYNARD J.G. TIPPER
BY
Gordon Wood
ATTORNEY April 16, 1968  M. J. G. TIPPER  3,377,692
CLIPPING APPARATUS
Filed Oct. 13, 1966  3 Sheets-Sheet 2

INVENTOR
MAYNARD J. G. TIPPER
BY
Gordon Wood
ATTORNEY

April 16, 1968  M. J. G. TIPPER  3,377,692
CLIPPING APPARATUS
Filed Oct. 13, 1966  3 Sheets-Sheet 3

INVENTOR
MAYNARD J. G. TIPPER
BY
ATTORNEY 3,377,692
CLIPPING APPARATUS
Maynard J. G. Tipper, Corona Del Mar, Calif., assignor to Rheem Manufacturing Company, New York, N.Y., a corporation of California
Filed Oct. 13, 1966, Ser. No. 586,424
5 Claims. (Cl. 29—243.57)

ABSTRACT OF THE DISCLOSURE

A device for gathering and sealing an elongated flexible member such as a sausage casing wherein a clipper cooperates with a die to apply a U-shaped clip around such member. The die and clipper are supported on the piston and cylinder of a fluid driven cylinder for relative movement toward each other to a clipping point at which the clip is applied.

---

This invention relates to a clipping apparatus of the type adapted to secure a fastener or clip to a deformable material such as a sausage casing. Although the present invention will be described with reference to the securement of clips around sausage casings in conjunction with a stuffing or sizing machine, it will be apparent that the invention has application to other operations of like character.

At present it is the usual practice to employ U-shaped clips to close and seal the ends of a casing containing stuffed sausage or the like. Similarly, clipping devices have been provided for necking down and clipping elongated filled casings at spaced points along their lengths to form chubs. In this latter type of operation the casing is stuffed continuously from a stuffing horn and said stuffed casing is contracted by means of a gathering device and thereafter a U-shaped clip is tightly secured around the gathered necked-down portion. An example of a device having a swinging gate adapted for such an application is that shown in U.S. Patent No. 2,880,419.

One of the disadvantages of prior art devices for gathering and clipping elongated members such as stuffed sausages is that there has not been sufficient room made available for passage of the partially filled casings through the apparatus so that the latter becomes difficult to operate without a great deal of skill. Furthermore, the gathering operation such as is performed by the apparatus shown in the above-mentioned patent merely involves a lateral squeezing in one direction so that the flexible member is not uniformly contracted radially prior to the clipping operation.

The main object of the present invention is the provision of an apparatus that overcomes the disadvantages of prior art devices of like nature.

Another object of the invention is the provision of a novel combination of clipper and die which provides a relatively large aperture to receive therethrough the member to be clipped so that the operator may readily position such member relative to the apparatus.

Another object of the invention is the provision of a clipping device that includes a gathering means of much greater effectiveness in obtaining a uniform tying effect on the deformable material than has been possible heretofore.

Other objects and advantages will be apparent from the following specification and drawings:

FIG. 1 is a side elevation of the preferred form of the invention showing it cooperating with a stuffing horn and a sausage casing.

FIG. 2 is a semi-schematic fragmentary exploded perspective showing the cooperation between the gathering plates and the punch and die structure.

Figure 3:
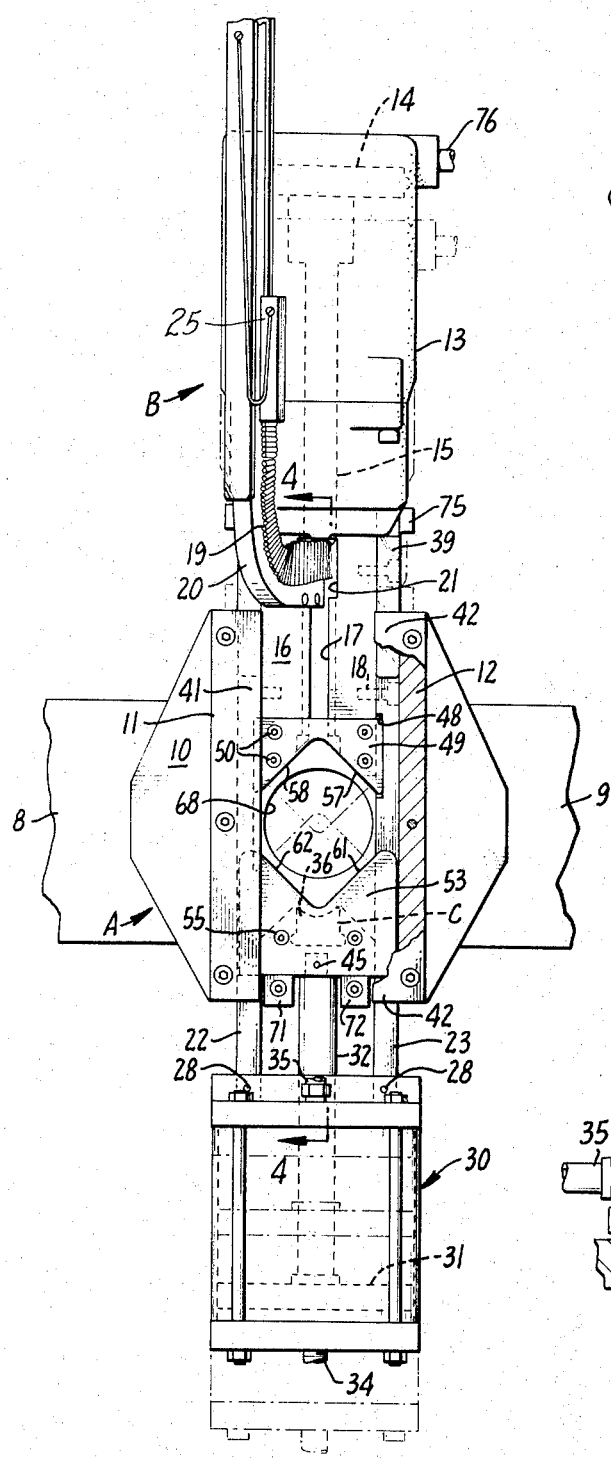
FIG. 3 is a rear elevation of the device of FIG. 1 looking toward the stuffing horn and showing the apparatus in open position.

In detail, the invention may be considered as comprising three main parts. These are: a housing generally designated A, a clipper generally designated B, and a die portion generally designated C.

Housing A comprises a support plate 10 which is secured in a fixed position by attachment to any suitable structure such as mounting plates 8, 9. Bolted to support plate 10 are a pair of opposed vertically extending guides 11, 12 respectively, which are adapted to slidably support therebetween both the upper structure B of the clipper and the lower structure C of the die.

The clipper structure B comprises a cylinder 13 provided with a piston 14 to which is secured the upper end of an elongated punch 15. The lower end of punch 15 extends through the lower end of cylinder 13 and is slidably received within a feed support 16. This feed support 16 is in the form of a vertically elongated block fixedly secured to the upper ends of a pair of elongated connector bars 22, 23 by means of bolts 18.

Feed support 16 is provided with an elongated vertically extending track 17 along which the U-shaped clips 19 are adapted to be translated downwardly.

As best seen in FIG. 3, the clips 19 are fed to the feed support 16 from a generally vertically extending clip rail 20 through a generally rectangular opening 21 in feed support 16. The clips may be urged into their loaded position by means of a weight 25 carried by rail 20.

The feed support block 16 is secured at its upper end to the lower end of cylinder 13 by means of bolts 24 and, since said block is also secured to the upper ends of connector bars 22, 23 a rigid connection is thus obtained between the upper ends of the connector bars 22, 23 and the cylinder 13. The lower ends of connector bars 22, 23 are secured by means of bolts 28 to the upper end of a hydraulic cylinder 30 which is provided with a piston 31 and an upwardly extending piston rod 32. Secured to the upper end of piston rod 32 is a die support 33 in which is secured a die 36 adapted to cooperate with the lower end of punch 15 to deform a clip 19 about the elongated flexible article to be sealed.

The cylinder 30 is provided at its lower end with an inlet 34 for air or other fluid and at its upper end with an inlet 35. At this point it may be noted that upon introduction of fluid under pressure through lower inlet 34, the upper end of piston rod 32 carrying the die support 33 is urged relatively away from cylinder 30. In other words, the upper cylinder 13 which is in effect carried by cylinder 30 is urged downwardly toward the die support 33 as the latter is urged upwardly. In this manner it will be seen that the apparatus may be moved from the open position of FIG. 3 in which the clipper structure B is remote from the die structure C to the position of FIG. 5 wherein the clipper structure B is closely adjoining the die structure C.

Figure 6:
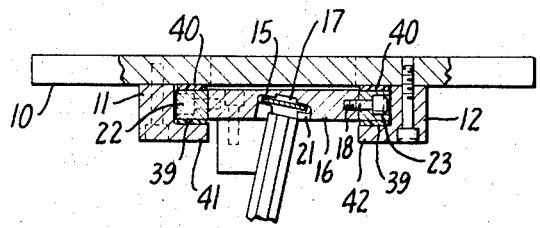
FIG. 6 is a horizontal section taken in a plane indicated by lines 6—6 of FIG. 5.
Figure 5:
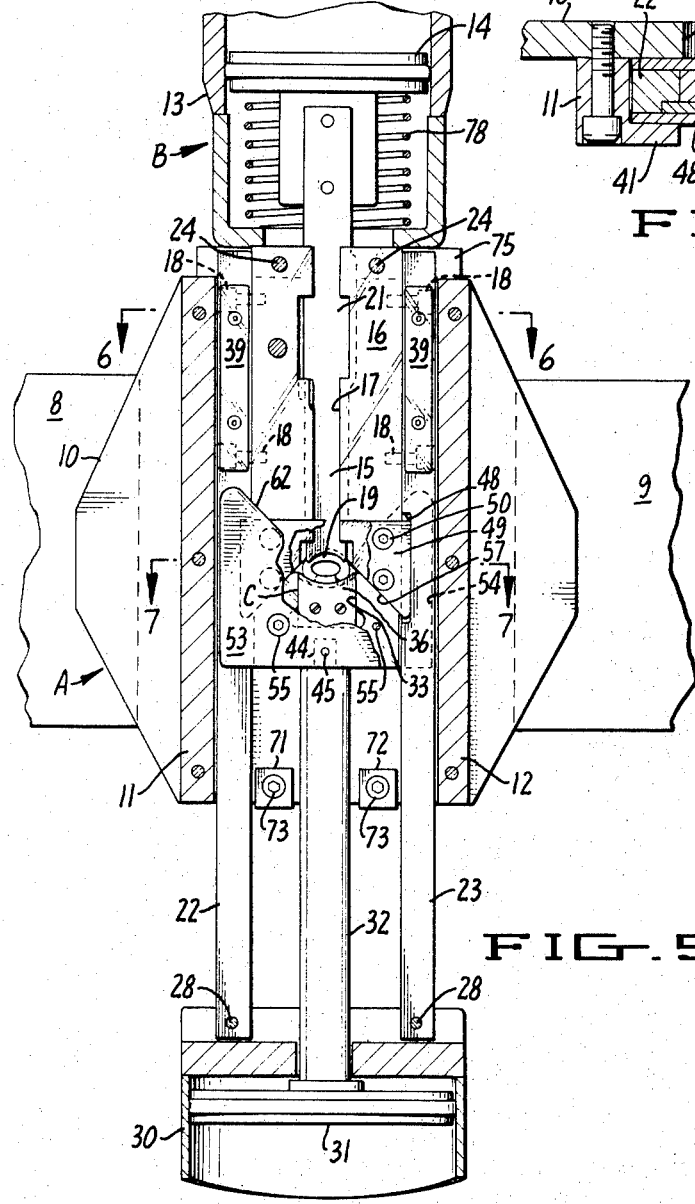
FIG. 5 is an enlarged fragmentary rear elevation with portions broken away to show internal structure and showing the apparatus in closed position.

As best seen in FIGS. 5, 6, the upper ends of connecting bars 22, 23 are provided on one side with nylon bearing strips 39 and on their other sides with bearing strips 40. The combined thickness of the bearing strips 39, 40 and the connecting bars 22, 23 is such that the clipper structure is slidably supported in the channel formed between support plate 10 and flanges 41, 42 of guides 11, 12 respectively.

Figure 4:
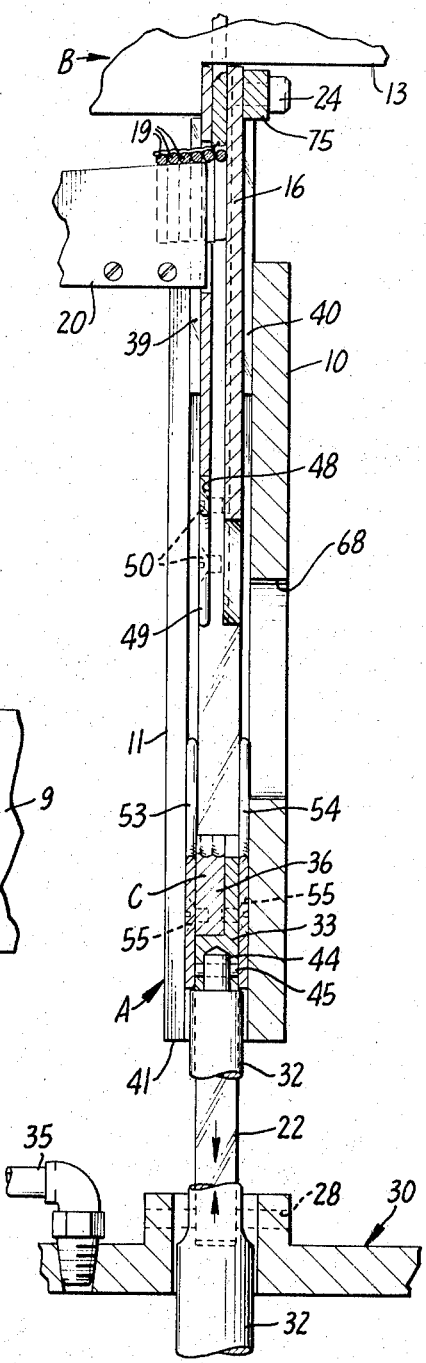
FIG. 4 is an enlarged vertical sectional view taken in a plane indicated by lines 4—4 of FIG. 3.

In order to secure the upper end of piston rod 32 to the die support 33, the latter is provided with a downwardly opening recess into which the reduced diameter portion 44 at the upper end of piston rod 32 is received (FIG. 4). Securement of the die support 33 to the piston rod 32 is effected by means of a pin 45 passing through the reduced diameter portion 44.

Figure 7:
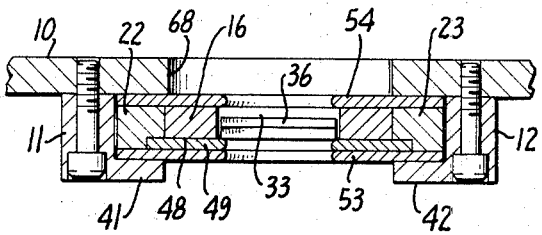
FIG. 7 is a horizontal section taken in a plane indicated by lines 7—7 of FIG. 5.

As best seen in FIG. 7, connector bars 22, 23 and the feed support 16 are recessed as at 48 to receive a gathering plate 49 which is secured to feed support 16 by means of bolts 50 (FIG. 5). The outer surface of gathering plate 49 is thus made coplanar with the outer surface of feed support 16.

The die support 33 is provided on its opposite sides with a pair of similar gathering plates 53, 54 which are secured to guide support 33 by means of bolts 55. The combined width of die support 33 and the two gathering plates 53, 54 is such that the assembly is slidably received between the support plate 10 and flanges 41, 42 of guides 11, 12. The coaction between the lower gathering plates 53, 54 on die support 33 and the upper gathering plate 49 carried by feed support 16 is best seen in FIGS. 2 and 7. It will be seen that the downwardly diverging lower edges 57, 58 of upper gathering plate 49 cooperate with the upwardly diverging upper edges 61, 62 of gathering plate 53 to progressively neck down the flexible material 63 constituting the casing and its contents or other article being clipped. At the same time lower gathering plate 54 provided with upwardly diverging upper edges 65, 66 cooperates with the similarly shaped lower end of feed support 16 to provide the gathering effect at the inlet end of the apparatus.

Support plate 10 is provided with a central aperture 68 through which the casing material 63 may be fed from the horn 64. In a manner that is well known in the art, an operator may adjust the stuffing rate of the material from horn 64 into the casing or other material 63 so as to form the desired length of sausage or the like indicated at 69. When the desired amount of meat has been fed into the material 63, the present device may be actuated to apply a clip 19 by the coaction between die 36 and punch 15. From the above description it will be apparent that the clipped material 63 is effectively contracted radially by the coaction between gathering plates 49, 53, 54 and feed support 16 prior to the clipping step which will now be described.

The apparatus is moved from its open position of FIG. 3 to the closed position of FIG. 5 by introducing fluid under pressure through lower inlet 34 of cylinder 30. Since the clipping structure and die structure are both supported on the fixed housing A, the introduction of fluid under pressure through inlet 34 of cylinder 30 and exhausting through inlet 35 results in the clipping structure and die structure being moved toward each other to the position of FIG. 5. The lower end of feed support 16 and the upper end of die support 33 are complementarily formed with the feed support diverging downwardly and the die support converging upwardly so that a positive stop is provided between said feed support and die support in the closed position of the apparatus shown in FIG. 5.

A pair of stops 71, 72 are secured to the lower end of support plate 10 by bolts 73 to limit the downward movement of the die support 33 as shown in the open position of FIG. 3. Downward movement of the clipper structure B is limited by a stop comprising a bar 75 which is secured to the cylinder 13 by the same bolts 24 that secure the feed support 16. As seen in FIG. 5 bar 75 is adapted to engage the upper edge of support plate 10 when the feed support 16 is in the closed position of FIG. 5.

After the apparatus has been moved to the closed position of FIG. 5, air or other fluid is introduced through inlet 76 (FIG. 1) at the upper end of cylinder 13 to drive the piston 14 downwardly thus urging a clip 19 downwardly along the track 17 and into engagement with the die 36. Upon exhausting cylinder 13 through inlet 76 compression spring 78 returns the piston 14 and punch 15 to their retracted position. The apparatus may then be opened by introducing fluid through inlet 35 at the upper end of cylinder 30 and exhausting through inlet 34. The particular means by which cylinders 30 and 13 are energized and the piping and valving arrangements used therewith are not shown in detail and the same may be of conventional design as applied to the subject type of apparatus.

It should be noted that the diameter of cylinder 30 is preferably slightly greater than the diameter of the clipper cylinder 13 so that when the same source of fluid under pressure is used for both cylinders the downward force on the punch 15 is not great enough to overcome the upward force on die 36 during the clipping operation.

It will be seen that the present invention is particularly adapted for use with elongated flexible articles and has the advantage over the prior art of providing a relatively large area through which the article may be passed and providing means for gathering and necking down the article to be clipped before the actual clipping operation is carried out.

It will be understood that the single clipper structure B may be replaced by a double clipper of the type wherein a double punch and two feed rails for clips are provided so as to apply two clips at a time at slightly spaced apart points on the filled casing. In this manner the sausages or chubs formed may be separated by cutting the casing between the two clips. However the operation of the apparatus is substantially the same when a single or double clipper is employed.

Although FIG. 1 shows a sausage being necked down and clipped at the partially filled portion thereof, in some cases such as for chubs, the entire filled section may be contracted and clipped.

The above specific description of the preferred form of the invention should not be taken as restrictive thereof as it will be apparent that various modifications in design may be resorted to without departing from the scope of the following claims.

I claim:

1. Apparatus for contracting and tying an elongated member of deformable material at a point along the length of said member comprising:
    a housing formed with an opening adapted to receive said member therethrough,
    a die structure at one side of said opening,
    a clipping structure, including a clip driver, adapted to cooperate with said die structure and positioned on the opposite side of said opening,
    fluid operated means including a cylinder and piston, means mounting said cylinder and said piston on said housing for movement of said cylinder and said piston relative to said housing,
    one of said structures being carried by said cylinder and the other carried by said piston whereby upon actuation of said fluid operated means said die structure and clipping structure are urged toward each other for contracting said member to a clipping point centrally of said opening,
    and means for operating said clipping structure at said point for tying said member.

2. Apparatus according to claim 1 wherein said die structure and clipping structure are formed with mutually abutting surfaces for positioning said structures at a predetermined position relative to said clipping point.

3. Apparatus according to claim 1 wherein said die structure is carried by the piston of said fluid operated means, and said clipping structure is fixedly connected to said cylinder by an elongated member slidably supported on said housing.

4. Apparatus according to claim 3 wherein stop means is provided for limiting the amount of travel of said clipper structure relative to said housing whereby said clipping point is fixed relative to said housing.

5. Apparatus according to claim 3 wherein a fluid pressure source is connected with said fluid operated means and with said means for operating said clipping structure, said last mentioned means including a punch actuating cylinder in said clipping structure, and wherein the area of the cylinder of said fluid operated means is greater than the area of said punch actuating cylinder to permit said die structure to resist the clipping force of said clipping structure.

References Cited

UNITED STATES PATENTS

| 2,886,816 | 5/1959 | Hill | 29—243.57 X |
| 3,055,010 | 9/1962 | Maestri | 29—243.57 X |

FOREIGN PATENTS

| 1,123,588 | 2/1962 | Germany. |

MILTON S. MEHR, *Primary Examiner.*